United States Patent
Takada

(10) Patent No.: US 9,367,927 B2
(45) Date of Patent: Jun. 14, 2016

(54) MOVING IMAGE REGION DETECTION DEVICE

(75) Inventor: Jun Takada, Tokyo (JP)

(73) Assignee: NEC Corporation, Tokyo (JP)

( * ) Notice: Subject to any disclaimer, the term of this patent is extended or adjusted under 35 U.S.C. 154(b) by 250 days.

(21) Appl. No.: 14/131,417

(22) PCT Filed: May 10, 2012

(86) PCT No.: PCT/JP2012/003045
§ 371 (c)(1),
(2), (4) Date: Jan. 7, 2014

(87) PCT Pub. No.: WO2013/008374
PCT Pub. Date: Jan. 17, 2013

(65) Prior Publication Data
US 2014/0147044 A1    May 29, 2014

(30) Foreign Application Priority Data
Jul. 13, 2011  (JP) .................................. 2011-154389

(51) Int. Cl.
*G06K 9/00* (2006.01)
*G06K 9/34* (2006.01)
(Continued)

(52) U.S. Cl.
CPC ................. *G06T 7/2053* (2013.01); *G06T 7/40* (2013.01); *G09G 5/346* (2013.01); *G09G 5/393* (2013.01); *H04N 19/103* (2014.11); *H04N 19/137* (2014.11); *H04N 19/176* (2014.11); *H04N 19/543* (2014.11); *G06T 2207/10016* (2013.01); *G06T 2207/20021* (2013.01);
(Continued)

(58) Field of Classification Search
None
See application file for complete search history.

(56) References Cited

U.S. PATENT DOCUMENTS

| 6,766,037 B1 * | 7/2004 | Le .......................... G06K 9/342 |
|---|---|---|
| | | 382/107 |
| 2006/0274158 A1 | 12/2006 | Tatsumi et al. |

(Continued)

FOREIGN PATENT DOCUMENTS

| CN | 101043609 | 9/2007 |
|---|---|---|
| JP | 10-322595 | 12/1998 |

(Continued)

OTHER PUBLICATIONS

International Search Report corresponding to PCT/JP2012/003045, dated May 30, 2012, 5 pages.

*Primary Examiner* — Stephen R Koziol
*Assistant Examiner* — Sean Conner
(74) *Attorney, Agent, or Firm* — Wilmer Cutler Pickering Hale and Dorr LLP

(57) ABSTRACT

The moving image region detection device includes an updated block detection means, a natural image updated block determination means, and a moving image block extraction means. The updated block detection means compares pixel values between a frame of an input video and the previous frame, and detects a block including a pixel in which a value having been changed, as an updated block. The natural image updated block determination means calculates an index value representing a degree of continuity of changes in pixel values in the updated block, compares the calculated index value with a threshold, and determines whether it is an updated block of a natural image. The moving image block extraction means extracts a block determined to be an updated block of a natural image a given number of times or more in most recent frames including the frame, as a moving image block of a natural image.

7 Claims, 14 Drawing Sheets

(51) Int. Cl.
*G06T 7/20* (2006.01)
*G06T 7/40* (2006.01)
*G09G 5/34* (2006.01)
*G09G 5/393* (2006.01)
*H04N 19/176* (2014.01)
*H04N 19/103* (2014.01)
*H04N 19/137* (2014.01)
*H04N 19/543* (2014.01)
*H04N 5/14* (2006.01)
*H04N 19/23* (2014.01)
*H04N 19/12* (2014.01)
*H04N 19/136* (2014.01)
*H04N 19/174* (2014.01)

(52) U.S. Cl.
CPC ............... *G06T 2207/20224* (2013.01); *G09G 2320/103* (2013.01); *H04N 5/145* (2013.01); *H04N 19/12* (2014.11); *H04N 19/136* (2014.11); *H04N 19/174* (2014.11); *H04N 19/23* (2014.11)

(56) References Cited

U.S. PATENT DOCUMENTS

| | | | | |
|---|---|---|---|---|
| 2007/0222895 A1* | 9/2007 | Yamauchi | ............ | H04N 5/445 348/701 |
| 2012/0177249 A1* | 7/2012 | Levy | ............ | G06K 9/325 382/103 |

FOREIGN PATENT DOCUMENTS

| | | |
|---|---|---|
| JP | 2002-140711 | 5/2002 |
| JP | 2002-247611 | 8/2002 |
| JP | 2004-180235 | 6/2004 |
| JP | 2004-341356 | 12/2004 |
| JP | 2005-287035 | 10/2005 |
| JP | 2006-324979 | 11/2006 |
| JP | 2007-259314 | 10/2007 |
| JP | 2007-287006 | 11/2007 |
| JP | 2009-003598 | 1/2009 |
| JP | 2010-213180 | 9/2010 |

* cited by examiner

$$D_U(x,y) = |P_{cur}(x,y) - P_{cur}(x,y-1)| \quad \cdots (1-1)$$
$$D_L(x,y) = |P_{cur}(x,y) - P_{cur}(x-1,y)| \quad \cdots (1-2)$$
$$F(x,y) = \begin{cases} 0 & (D_U(x,y)=0 \text{ and } D_L(x,y)=0 \\ 1 & (\text{otherwise}) \end{cases} \quad \cdots (1-3)$$
$$E_{val} = \frac{\sum [F(x,y) \cdot \text{Max}\{D_U(x,y), D_L(x,y)\}]}{\sum F(x,y)} \quad \cdots (1-4)$$

FIG. 12

$$D_P(x,y) = |P_{cur}(x,y) - P_{prv}(x,y)| \quad \cdots (2-1)$$

$$D_L(x,y) = |P_{cur}(x,y) - P_{cur}(x-1,y)| \quad \cdots (2-2)$$

$$E_P(x,y) = |D_P(x,y) - D_P(x-1,y)| \quad \cdots (2-3)$$

$$E_L(x,y) = |D_L(x,y) - D_L(x-1,y)| \quad \cdots (2-4)$$

$$F(x,y) = \begin{cases} 0 & (E_P(x,y)=0 \text{ or } E_L(x,y)=0 \\ 1 & (\text{otherwise}) \end{cases} \quad \cdots (2-5)$$

$$E_{val} = \frac{\sum [F(x,y) \cdot \text{Min}\, [E_P(x,y), E_L(x,y)]]}{\sum F(x,y)} \quad \cdots (2-6)$$

FIG. 13

$$D_N(x,y) = |P_{cur}(x,y) - P_{cur}(x,y+1)| \quad \cdots (3-1)$$
$$D_P(x,y) = |P_{cur}(x,y) - P_{prv}(x,y)| \quad \cdots (3-2)$$
$$D_{NL}(x,y) = |P_{cur}(x,y+1) - P_{cur}(x-1,y+1)| \quad \cdots (3-3)$$
$$D_{PN}(x,y) = |P_{cur}(x,y+1) - P_{prv}(x,y+1)| \quad \cdots (3-4)$$
$$E_{val}(y) = \sum_x [D_N(x,y) - D_{NL}(x,y) + D_P(x,y) - D_{PN}(x,y)] \quad \cdots (3-5)$$

MOVING IMAGE REGION DETECTION DEVICE

CROSS-REFERENCE TO RELATED APPLICATIONS

This application is a national stage application of International Application No. PCT/JP2012/003045 entitled "Moving Image Area Detection Device," filed on May 10, 2012, which claims the benefit of the priority of Japanese Patent Application No. 2011-154389, filed on Jul. 13, 2011, the disclosures of each of which are hereby incorporated by reference in their entirety.

TECHNICAL FIELD

The present invention relates to a region separation technique for video signals, and in particular, to a device and a method for detecting moving image regions of natural images from an input video.

BACKGROUND ART

Various techniques for detecting moving image regions from video signals have been invented.

For example, Patent Document 1 discloses that first, a current frame and a previous frame are compared by each pixel to generate inter-frame pixel information. Then, based on the inter-frame pixel information, the direction of motion and the quantity of motion of the current frame image, with respect to the previous frame image, are calculated to detect one or more motion vectors. Then, based on the motion vectors and the inter-frame pixel information, one or more moving image regions in the current frame are detected.

Meanwhile, various techniques for detecting natural image regions from video signals have been invented.

For example, Patent Document 2 discloses that first, the luminance level of all or part of the pixels, in predetermined units, of image data is detected by each frame of an input video. Then, based on the detection result, the accumulation value of the quantity of variation of the luminance level between the respective pixels, in which the luminance levels have been detected, is calculated. Then, based on the calculated accumulation value, based on an average value of the quantity of variation of the luminance level between pixels calculated by dividing the accumulation value by the number of pixels, or based on the number of pieces of edges in which the quantity of variation of the luminance level between respective pixels is within a predetermined range, it is determined whether or not an input video is a natural image.

Patent Document 3 discloses that a current frame and a previous frame of a video is compared to detect one or more updated regions, and for each of the updated regions, it is determined whether or not it is a natural image based on the color entropy.

Patent Document 1: JP 2004-341356 A
Patent Document 2: JP 2002-247611 A
Patent Document 3: JP 2005-287035 A

SUMMARY

While the invention of Patent Document 1 pays attention to whether or not there is any object with motion in each region, the invention does not determine whether or not an object is a natural image. As such, a region where a character or a graphic, which is a non-natural image, moves and a region where a natural image moves are not distinguishable. Accordingly, it is impossible to correctly detect a region of a moving natural image from an input video.

On the other hand, in Patent Document 2, although it is detected that whether or not an input video is a natural image, the relationship between frames of the input video is not taken into account. As such, it is impossible to distinguish whether the image is a still image of a natural image or a moving image of a natural image. Accordingly, it is impossible to correctly detect a region of a moving natural image from an input video.

In Patent Document 3, although an updated region is detected by each frame of an input image, it is impossible to distinguish an image when a still image of a natural image is displayed for the first time from an image when a moving image of a natural image is displayed for the first time. Accordingly, it is impossible to correctly detect a region of a moving natural image from an input video.

An object of the present invention is to provide a moving image region detection device which solves the above-described problem, that is, a problem that it is difficult to correctly detect a region of a moving natural image from an input video.

A moving image region detection device, according to an aspect of the present invention, is configured to include an updated block detection means for comparing pixel values between a current frame and a previous frame of an input video, and detecting a block including a pixel in which a value has been changed as an updated block;

a natural image updated block determination means for, with respect to each of the updated blocks, calculating an index value representing a degree of continuity of changes in pixel values in the block, comparing the calculated index value with a threshold, and determining whether or not the updated block is an updated block of a natural image; and a moving image block extraction means for extracting a block of a coordinate determined to be an updated block of a natural image a given number of times or more in a plurality of most recent frames, as a moving image block of a natural image.

With the above-described configuration, the present invention is able to correctly detect a region of a moving natural image from an input video.

BRIEF DESCRIPTION OF DRAWINGS

FIG. 11 shows expressions corresponding to a first specific example of an operation of the moving image block determination means according to the second exemplary embodiment of the present invention.

FIG. 12 shows expressions corresponding to a second specific example of an operation of the moving image block determination means according to the second exemplary embodiment of the present invention.

FIG. 13 shows expressions corresponding to a specific example of an operation of the moving image region boundary determination means according to the second exemplary embodiment of the present invention.

EXEMPLARY EMBODIMENTS

Next, exemplary embodiments of the present invention will be described in detail with reference to the drawings.

First Exemplary Embodiment

Figure 14:
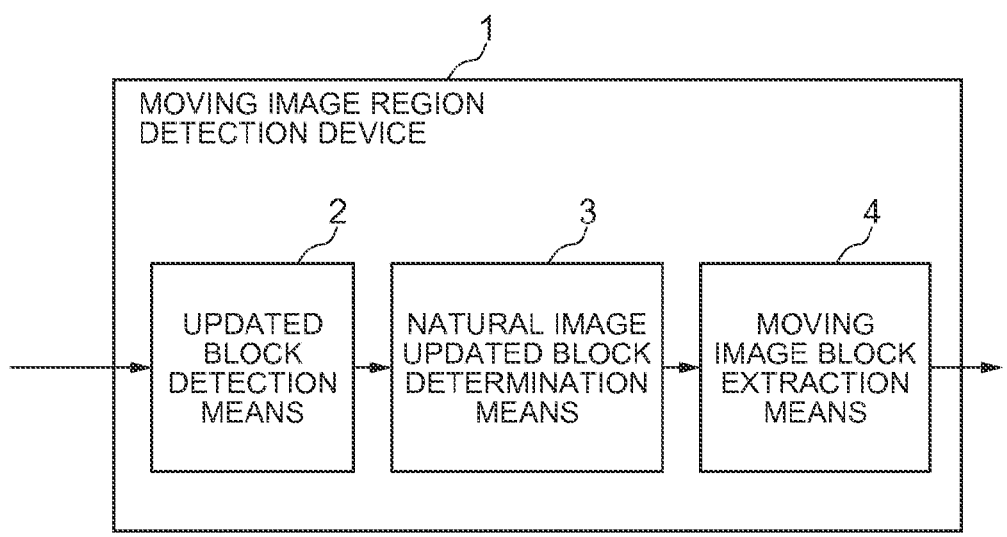
FIG. 14 is a block diagram showing a first exemplary embodiment of the present invention.

Referring to FIG. 14, a moving image region detection device 1, according to a first exemplary embodiment of the present invention, has a function of accepting an input video, detecting a region of a moving natural image from the input video, and outputting a detection result. The moving image region detection device 1 includes an updated block detection means 2, a natural image updated block determination means 3, and a moving image block extraction means 4.

The updated block detection means 2 divides a frame of an input video into blocks of a given size. Further, regarding each of the frames of the input video, the updated block detection means 2 handles the frame as a current frame and handles the frame immediate before it as a previous frame. The updated block detection means 2 has a function of comparing pixel values between the current frame and the previous frame, and detects a block of the current frame including a pixel in which the value has been changed, as an updated block. The size of the blocks and the number of the blocks can be set arbitrarily if they are the same in all frames.

The natural image updated block determination means 3 calculates, for each block detected as an updated block by the updated block detection means 2, an index value representing the degree of continuity of changes in pixel values in the block. The natural image updated block determination means 3 has a function of comparing the calculated index value with a threshold, and determining whether or not the block is an updated block of a natural image. Regarding the continuity of changes in pixel values in a block, there are two types including a continuity of changes in the pixel values between adjacent pixels in the same frame, and a continuity of changes in the pixel values between the same pixel in the previous and next frames. The natural image updated block determination means 3 may calculate the former index value representing the degree of spatial continuity, or calculate the latter index value representing the degree of temporal continuity, or calculate two kinds of index values which are the former and the latter.

The moving image block extraction means 4 has a function of, for each frame of the input video, extracting a block of a coordinate having been determined to be an updated block of a natural image a given number of times or more in a plurality of most recent frames, as a moving image block of a natural image. The number of most recent frames may be any number if it is two or larger. Further, a given number of times may be any number of times if it is 1 or 2 or more. It is desirable that the block has been determined to be an updated block of a natural image in two or more frames including at least the current frame.

Next, operation of the moving image region detection device 1 according to the present embodiment will be described.

When a video is input, the updated block detection means 2 compares pixel values between the current frame and the previously input frame (previous frame) of the input video, and detects a block including at least one pixel in which the value has been changed, as an updated block.

Next, for each block detected as an updated block by the updated block detection means 2, the natural image updated block determination means 3 calculates an index value representing a degree of continuity of changes in pixel values in the block, compares the calculated index value with a threshold, and determines whether or not the block is an updated block of a natural image. Generally, in the case of a natural image, the continuity of changes in pixel values tends to be higher spatially and temporarily, compared with the case of a non-natural image. The natural image updated block determination means 3 uses this characteristic to determine whether or not the updated block is an updated block of a natural image.

Then, for each frame of the input video, the moving image block extraction means 4 extracts, as a moving image block of a natural image, a block of a coordinate having been determined to be an updated block of a natural image a given number of times or more in a plurality of most recent frames. Generally, in the case of a moving image, the content tends to be changed in the respective frames, which is different from the case of a still image. The moving image block extraction means 4 uses this characteristic to determine whether or not the block is a moving image block.

As described above, according to the present embodiment, it is possible to accurately detect a region of a moving natural image from an input video. This is because blocks of not a natural image are eliminated in the stage of the natural image updated block determination means 3, blocks of not a moving image are eliminated in the stage of the moving image block extraction means 4, and consequently only blocks of a moving natural image are detected.

Second Exemplary Embodiment

Figure 1:
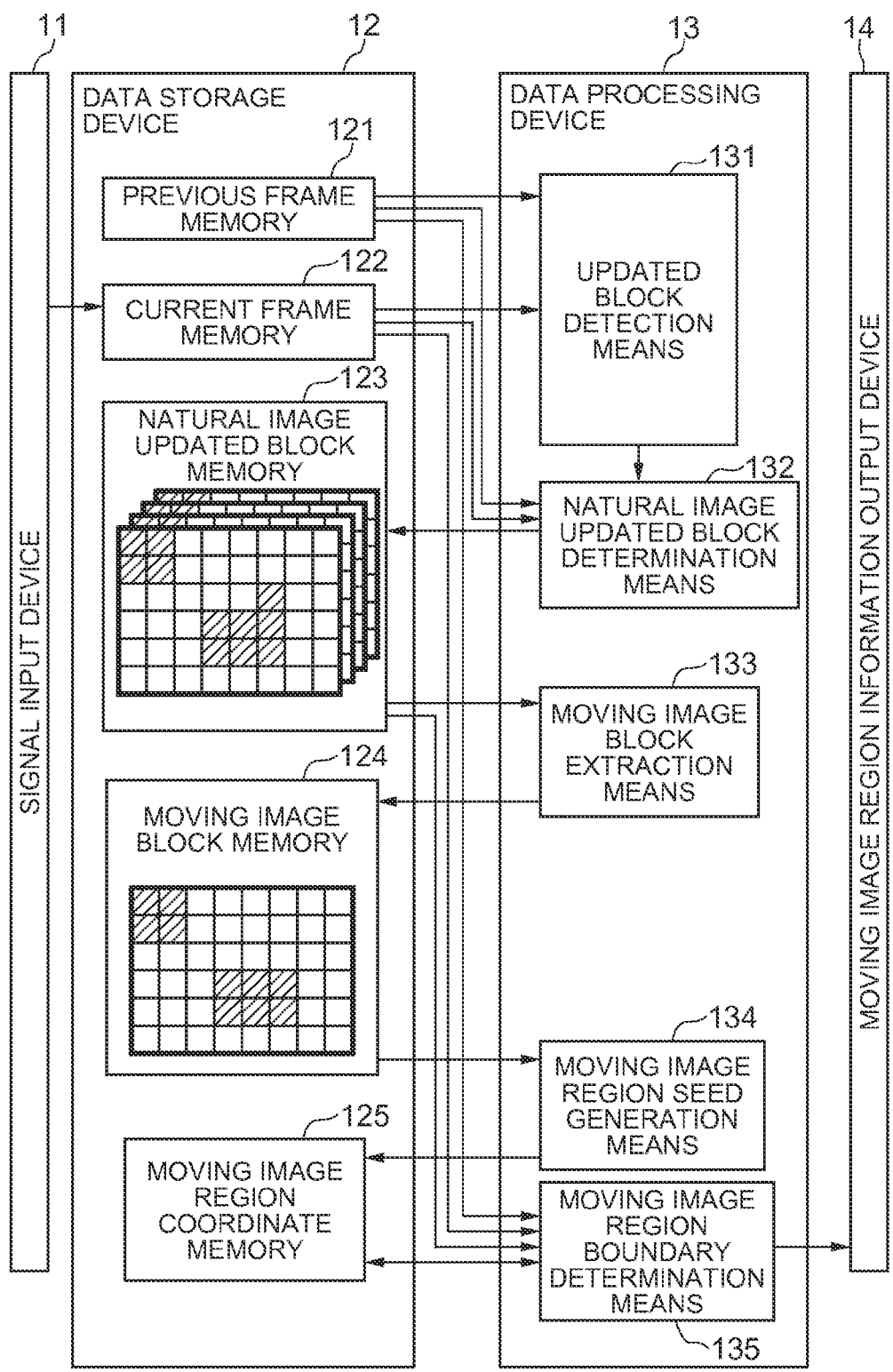
FIG. 1 is a block diagram showing a second exemplary embodiment of the present invention.

Referring to FIG. 1, a second exemplary embodiment of the present invention includes a signal input device 11, a data storage device 12, a data processing device 13 operated by program control, and a moving image region information output device 14.

The signal input device 11 is a device for inputting an image as two-dimensional signals in frame units, and includes a graphic drawing board and a communication device, for example.

The data storage device 12 includes a previous frame memory 121, a current frame memory 122, a natural image updated block memory 123, a moving image block memory 124, and a moving image region coordinate memory 125.

The previous frame memory 121 stores an image of a frame previously input from the signal input device 11.

The current frame memory 122 stores an image of a frame input from the signal input device 11 this time.

The natural image updated block memory 123 stores the position of a block in which a pixel value is updated between continuous frames and which has a high probability of a natural image, for the most recent N frames (N: natural number).

The moving image block memory 124 stores the position of a moving image block of a natural image derived from the states of the most recent N frames stored in the natural image updated block memory 123.

The moving image region coordinate memory 125 stores coordinates of a moving image region of a natural image derived, based on the moving image blocks stored in the moving image block memory 124 and the pixel values of the respective frames stored in the previous frame memory 121 and the current frame memory 122.

The data processing device 13 includes an updated block detection means 131, a natural image updated block determination means 132, a moving image block extraction means 133, a moving image region seed generation means 134, and a moving image region boundary determination means 135.

The updated block detection means 131 reads and compares the image of a previous frame stored in the previous frame memory 121 with the image of a current frame stored in the current frame memory 122, and with respect to the respective sub-regions (blocks) in the screen, determines whether or not there are any changes in the pixel values. The updated block detection means 131 determines a block in which the pixel value has been changed to be an updated block, and notifies the natural image updated block determination means 132 of the coordinate information of the updated block.

When the natural image updated block determination means 132 is notified of the coordinate information of the updated block from the updated block detection means 131, the natural image updated block determination means 132 reads the pixel value of each updated block from the previous frame memory 121 and the current frame memory 122, and calculates the spatial and temporal continuity of the pixel values. The natural image updated block determination means 132 determines a block in which the continuity is a given value or higher to be a natural image updated block, and outputs the coordinate information of such a block to the natural image updated block memory 123.

The moving image block extraction means 133 reads the state of a natural image updated block of the most recent N frames from the natural image updated block memory 123, determines a block, which is frequently detected as a natural image updated block, to be a moving natural image, and outputs the coordinate information of such a block to the moving image block memory 124.

The moving image region seed generation means 134 reads the information of the moving image blocks of a natural image from the moving image block memory 124, and links and integrates the spatially adjacent moving image blocks of a natural image. The moving image region seed generation means 134 determines a region obtained by the integration to be a moving image region seed of a natural image, and outputs the coordinate information thereof to the moving image region coordinate memory 125.

The moving image region boundary determination means 135 reads the coordinate of the moving image region seed of a natural image from the moving image region coordinate memory 125, reads the states of the most recent N frames from the natural image updated block memory 123, and reads the pixel values around the moving image region seed of the natural image from the previous frame memory 121 and the current frame memory 122, respectively. Then, based on the readout data, the moving image region boundary determination means 135 determines the coordinates of the boundary of the moving image region of the natural image in pixel units. Further, the moving image region boundary determination means 135 stores the obtained moving image region coordinates of the natural image in the moving image region coordinate memory 125, and outputs it to the moving image region information output device 14.

The moving image region information output device 14 includes a storage device which stores coordinates of the generated moving image region of a natural image, and a video encoding device which encodes the region with reference to the information of the generated moving image region of a natural image. Regarding video encoding, by using MPEG for moving image regions of a natural image, PNG for character regions, and JPEG for still image regions of a natural image, it is expected to encode still images and moving images with favorable compression rate while maintaining clear character edges.

Figure 2:
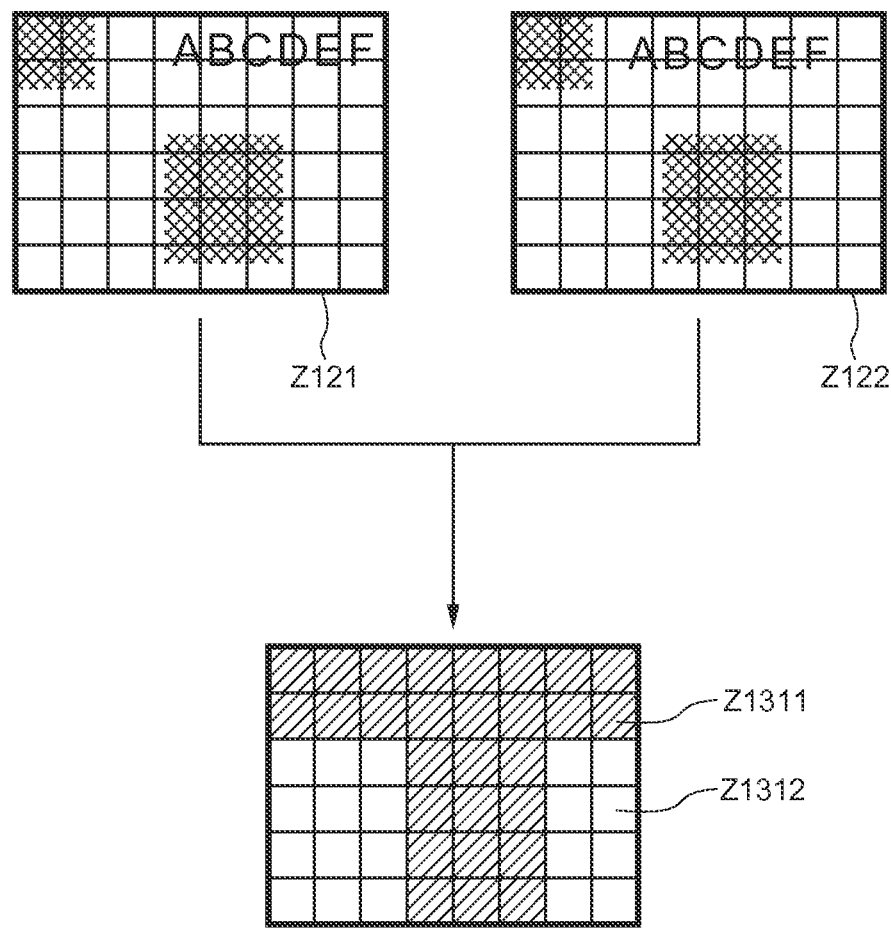
FIG. 2 illustrates a specific example of an operation of an updated block detection means according to the second exemplary embodiment of the present invention.

FIG. 2 shows a specific example of an operation of the updated block detection means 131.

In FIG. 2, Z121 shows a screen of a previous frame stored in the previous frame memory 121, and Z122 shows a screen of a current frame stored in the current frame memory 122. The shaded or dotted parts represent natural images. FIG. 2 also shows a scrolling ticker on the upper part of the screen.

The updated block detection means 131 divides a frame into blocks of a given size (e.g., 32 pixels×32 pixels), and for each of the blocks, determines whether or not the pixel value has been changed, and determines blocks with any difference to be updated blocks and determines blocks with no difference to be non-updated blocks. As a result of such processing, the current frame is separated into updated blocks Z1311 and non-updated blocks Z1312.

Figure 3:
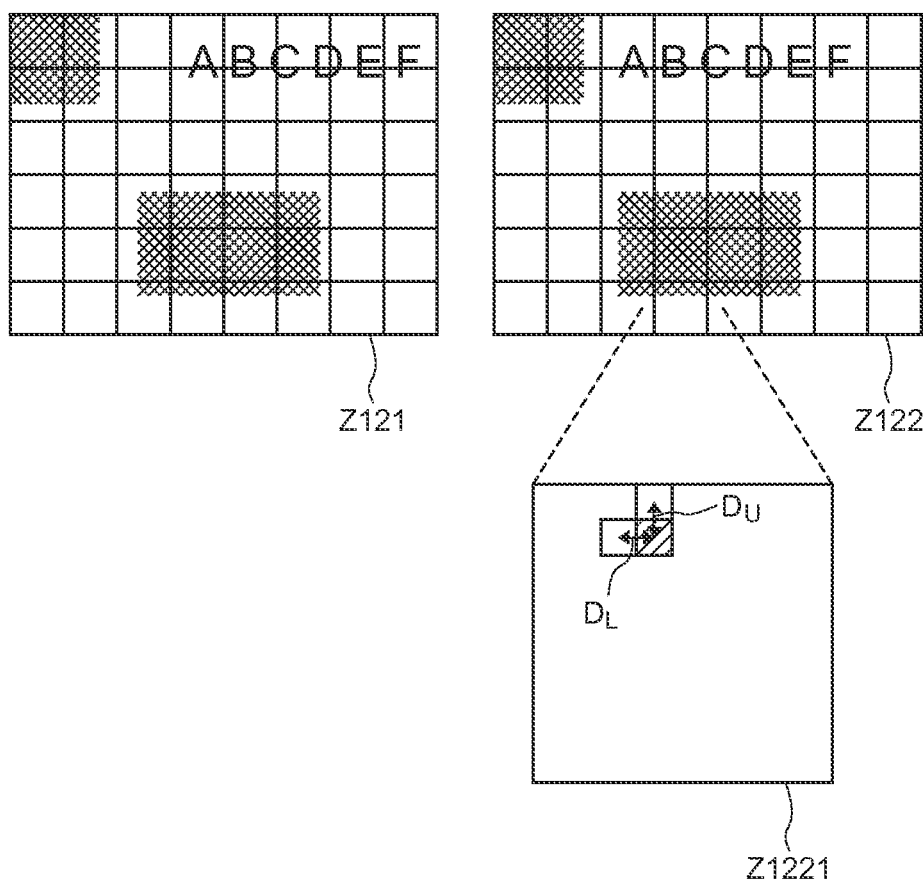
FIG. 3 illustrates a specific example of an operation of a natural image updated block determination means according to the second exemplary embodiment of the present invention.

FIG. 3 and Expression 1 (Expressions 1-1~1-4) in FIG. 11 show a first specific example of an operation of the natural image updated block determination means 132.

Z1221 shows one of the blocks in the current frame memory.

With respect to the pixel of each coordinate (x,y) in the updated block, the natural image updated block determination means 132 calculates an absolute value $D_L(x,y)$ of a difference from a pixel adjacent in a horizontal direction, and an absolute value $D_U(x,y)$ of a difference from a pixel adjacent in a vertical direction, and selects the value which is not smaller than the other. Then, the natural image updated block determination means 132 calculates an average value of the values in which the selected values are non-zero within the block, and the result is used as an index value Eval. Finally, the natural image updated block determination means 132 determines a block in which the index value is smaller than a given value to be an updated block of a natural image.

Figure 4:
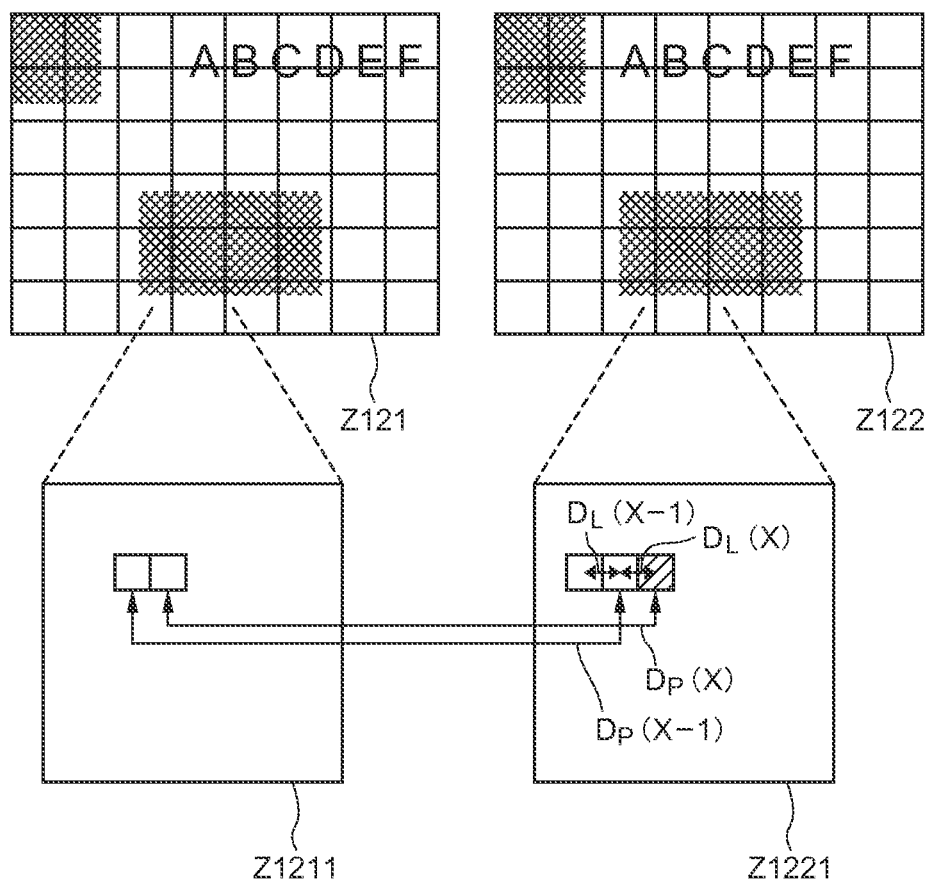
FIG. 4 illustrates a first specific example of an operation of a moving image block determination means according to the second exemplary embodiment of the present invention.

FIG. 4 and Expression 2 (Expressions 2-1~2-6) in FIG. 12 show a second specific example of an operation of the natural image updated block determination means 132.

Z1211 shows one of the blocks in the previous frame memory, and Z1221 shows one of the blocks in the current frame memory.

First, for the pixel of each coordinate (x,y) in an updated block, the natural image updated block determination means 132 calculates an absolute value $D_L(x,y)$ of a difference from a pixel adjacent in a horizontal direction, and an absolute value $D_P(x,y)$ of a difference from a pixel of the same coordinate in the previous frame. Then, regarding $D_L(x,y)$ and $D_P(x,y)$, the natural image updated block determination means 132 calculates absolute values of transitions $E_L(x,y)$ and $E_P(x,y)$ with $D_L(x-1,y)$ and $D_P(x-1,y)$ obtained in the last coordinate $(x-1,y)$, and selects the value, of $E_L$ and $E_P$, which is not larger than the other. Finally, the natural image updated block determination means 132 calculates an average value of the values in which the selected values are non-zero within the block, and the result is used as an index value Eval. Then, the natural image updated block determination means 132 determines a block in which the index value is smaller than a given value to be an updated block of a natural image.

Figure 5:
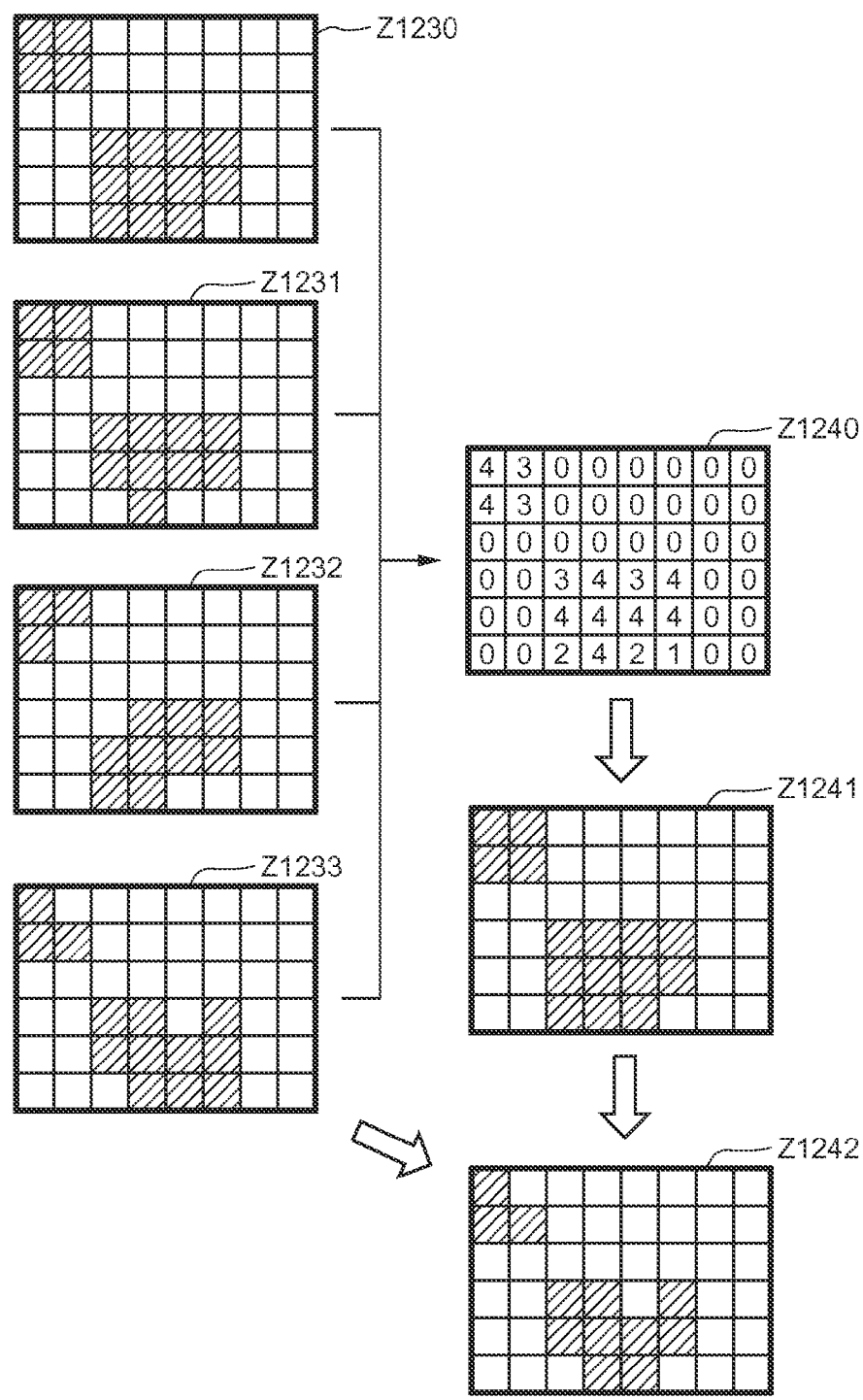
FIG. 5 illustrates a second specific example of an operation of the moving image block determination means according to the second exemplary embodiment of the present invention.

FIG. 5 shows a specific example of an operation of the moving image block determination means 133.

Z1230, Z1231, Z1232, and Z1233 show states of natural image updated blocks of the most recent N frames (N=4 in the example of FIG. 5) stored in the natural image updated block memory 123. Among them, Z1233 is a natural image updated block in the current frame.

First, the moving image block determination means 133 counts the number of times that each of the blocks is determined to be a natural image updated block in the most recent 4 frames, to thereby obtain a list Z1240 of the number of counts of the respective blocks. Then, the moving image block determination means 133 determines blocks in which the number of counts is m (m=2 in this example) or larger to be candidates of natural image updated blocks (Z1241). Then, among the candidates of the natural image updated blocks, the moving image block determination means 133 determines blocks, having been determined to be a natural image updated region in the current frame, to be natural image updated blocks (Z1242). The blocks obtained in this way are output to the moving image block memory 124 as moving image blocks of a natural image.

Figure 6:
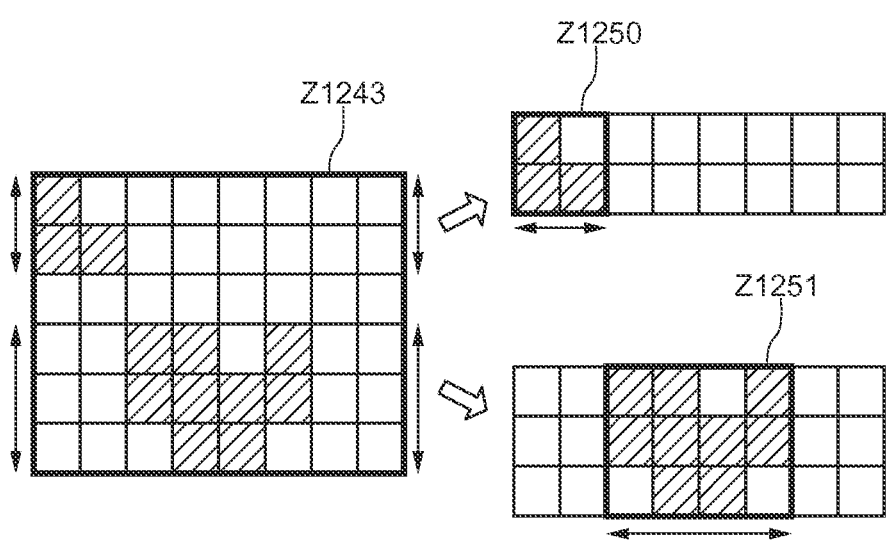
FIG. 6 illustrates a specific example of an operation of a moving image region seed generation means according to the second exemplary embodiment of the present invention.

FIG. 6 shows a specific example of an operation of the moving image region seed generation means 134.

The moving image region seed generation means 134 scans the moving image block memory 124 to detect a group of rows where moving image blocks are present. Z1243 shows that moving image blocks are present on the first and second rows and on the fourth, fifth, and sixth rows. In this case, the first and second rows and the fourth to sixth rows are detected as groups of rows. The moving image region seed generation means 134 also scans the divided groups of rows to detect a group of columns where moving image blocks are present. As such, regarding the first and second rows, the first and second columns from the left are detected as a group of columns, and regarding the fourth to sixth rows, the third to sixth columns from the left are detected as a group of columns where moving image blocks are present. The moving image region seed generation means 134 determines the groups (Z1250 and Z1251) detected in this way to be moving image region seeds of a natural image, and outputs the coordinates thereof to the moving image region coordinate memory 125.

Figure 7:
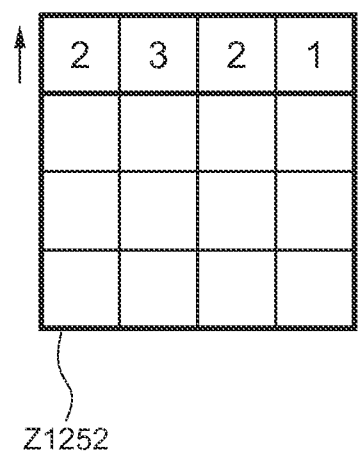
FIG. 7 illustrates a specific example of an operation of a moving image region boundary determination means according to the second exemplary embodiment of the present invention.
Figure 8:
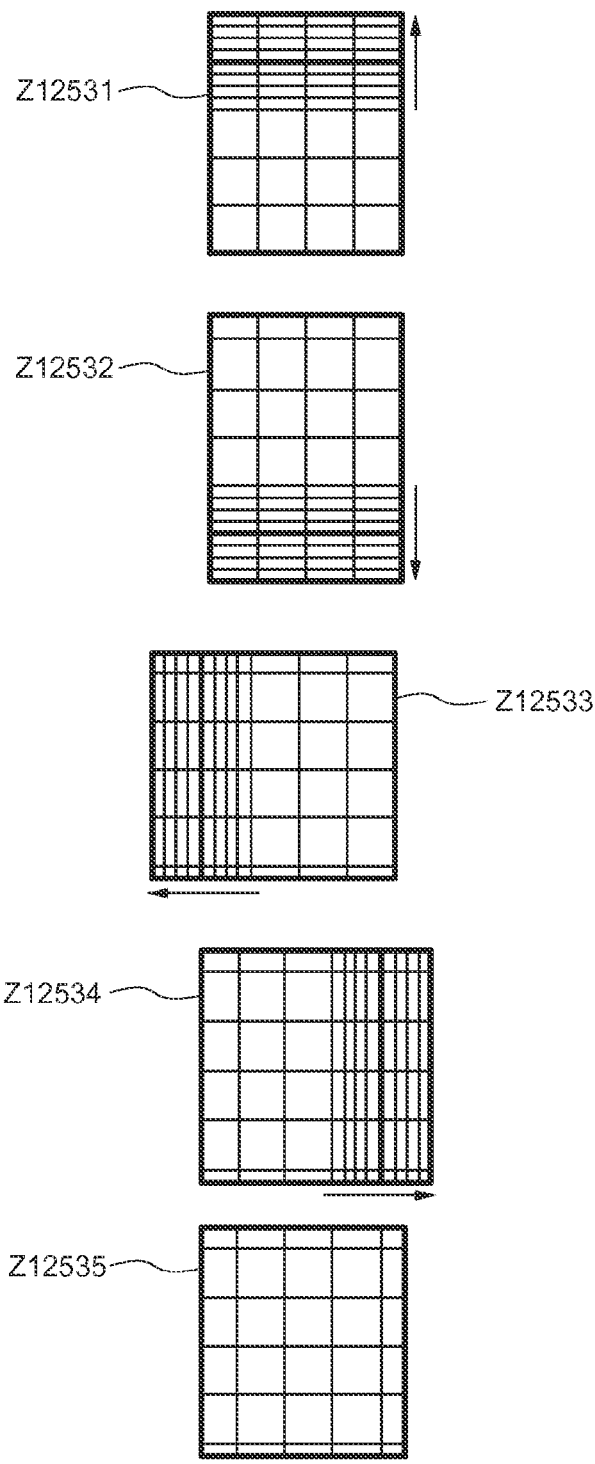
FIG. 8 illustrates a specific example of an operation of the moving image region boundary determination means according to the second exemplary embodiment of the present invention.
Figure 9:
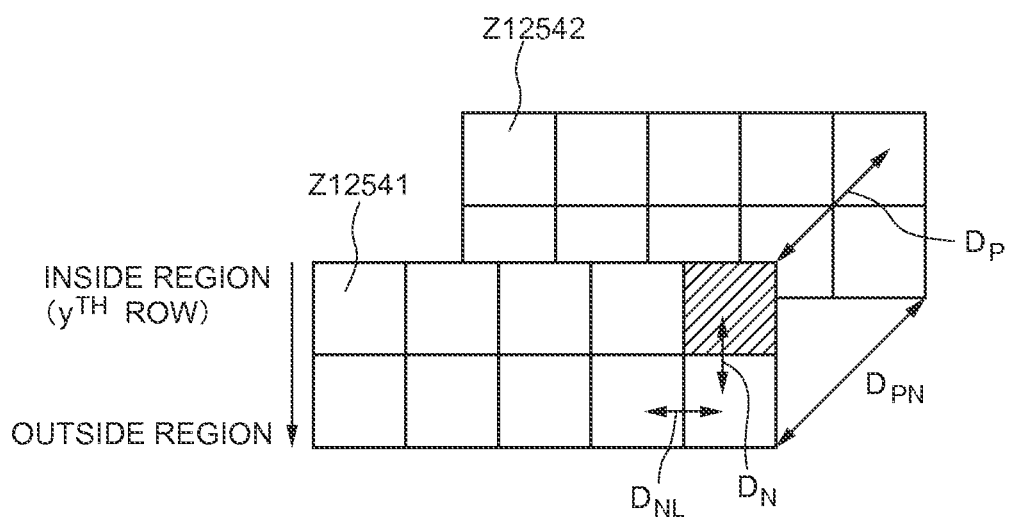
FIG. 9 illustrates a specific example of an operation of the moving image region boundary determination means according to the second exemplary embodiment of the present invention.

FIGS. 7, 8, and 9 and Expression 3 in FIG. 13 show specific examples of an operation of the moving image region boundary determination means 135.

The moving image region boundary determination means 135 sets the accurate boundary of the region for each of the moving image seeds of natural images, and outputs it to the moving image region information output device 14.

The moving image region boundary determination means 135 first attempts to expand each of the four edges in block units. In this example, description will be given with an example of expanding the boundary of the upper edge upward by one block.

In FIG. 7, Z1252 shows a state where the upper edge of the moving image region seed of 3×4 blocks is expanded. In this case, the moving image region boundary determination means 135 refers to the natural image updated block memory 123 and the moving image region coordinate memory 125 to calculate, for each of the blocks located one row above the moving image region seed, the number of times that the block is detected as a natural image updated block within the most recent N frames. FIG. 7 shows that the numbers of times that the four blocks, located one row above the seed, are detected as natural image blocks are 2, 3, 2, and 1, respectively.

Further, the moving image region boundary determination means 135 divides these numbers by the number of blocks in the width to calculate the average number of natural image updated blocks on the focused row. If the number is m or more (0<m≤N), the moving image region boundary determination means 135 expands the upper edge by one block. The moving image region boundary determination means 135 continues this processing until expansion in an upward direction cannot be made any more. In FIG. 7, the average number of updated blocks on the focused row is (2+3+2+1)/4=2. If m=2, 2≥m. As such, the upper edge is expanded by one block, and the attempt to expand the upper edge is continued.

The moving image region boundary determination means 135 also performs the same processing as that described above on the lower edge, the left edge, and the right edge to calculate the boundaries in block units, and outputs the obtained boundary coordinates to the moving image region coordinate memory 125.

Then, the moving image region boundary determination means 135 searches for the boundaries in pixel units. FIGS. 8 and 9 and Expression 3 show an example of search in pixel units.

The moving image region boundary determination means 135 refers to the previous frame memory 121, the current frame memory 122, and the moving image region coordinate memory 125 to search for the boundaries, in pixel units, of the four edges on the boundary, with respect to one inside block and one outside block (two blocks in total). The moving image region boundary determination means 135 calculates an evaluation index Eval by moving each of the edges by one pixel, and sets the line in which the index value becomes maximum within the search range as a boundary of the moving image region. Each time the boundary of each edge is set, the moving image region boundary determination means 135 rewrites the moving image region coordinate memory 125.

FIG. 8 shows a state where boundaries are searched in pixel units with respect to one inside block and one outside block (two blocks in total) of the four edges on the boundary. Boundary search is performed on the upper edge in Z12531, is performed on the lower edge in Z12531, is performed on the left edge in Z12533, and is performed on the right edge in Z12534. In each case, evaluation indexes are calculated for one inside block and one outside block while maintaining the boundary of the edge having been set, and a line in which the index value becomes maximum is searched.

FIG. 9 and Expression 3 (Expressions 3-1~3-5) in FIG. 13 show the process of deriving index values in boundary search performed on the lower edge. The index value Eval(y) on the $y^{th}$ row is calculated from the values of $D_P$, $D_N$, $D_{NL}$, and $D_{PN}$ on the respective coordinates on the $y^{th}$ row in the moving image region.

$D_P$ is a difference between the pixel value of a focused coordinate in the current frame and the pixel value of the same coordinate in the previous frame.

$D_N$ is a difference between the pixel value of a focused coordinate in the current frame and the pixel value outside thereof by one line.

$D_{NL}$ is a difference between the pixel values on the outside, by one line, of the focused coordinate in a direction orthogonal to the searching direction (in this case, horizontal direction) in the current frame.

$D_{PN}$ is a difference between the pixel value in the current frame and the pixel value in the previous frame of the coordinate outside, by one line, of the focused coordinate.

$D_P$, $D_N$, $D_{NL}$, and $D_{PN}$, as described above, are accumulated for one row based on Expression 3-5 in FIG. 13, and the index value Eval(y) on the $y^{th}$ row is calculated.

Finally, a line, in which Eval(y) becomes maxim in two blocks on the inside and outside, is selected as a boundary. The reason is as follows. In FIG. 9, if the inside of the region ($y^{th}$ row) is a natural image and the outside of the region is a non-natural image (for example, a blank row or a mask), the probability that $D_{NL}$ and $D_{PN}$ become 0 is high while the probability that $D_N$ and $D_P$ become large values to some extent is high. As such, Eval(y) takes a value of $D_N + D_P$. On the other hand, if both the inside of the region ($y^{th}$ row) and the outside of the region are natural images or both are non-natural images, the probability that the values of all of the $D_P$, $D_N$, $D_{NL}$, and $D_{PN}$ become large to some extent is high. As such, the probability that Eval(y) becomes a value near 0 is high.

The above-described processing is performed on the upper, lower, left, and right edges respectively, and boundaries in pixel units are determined.

Figure 10:
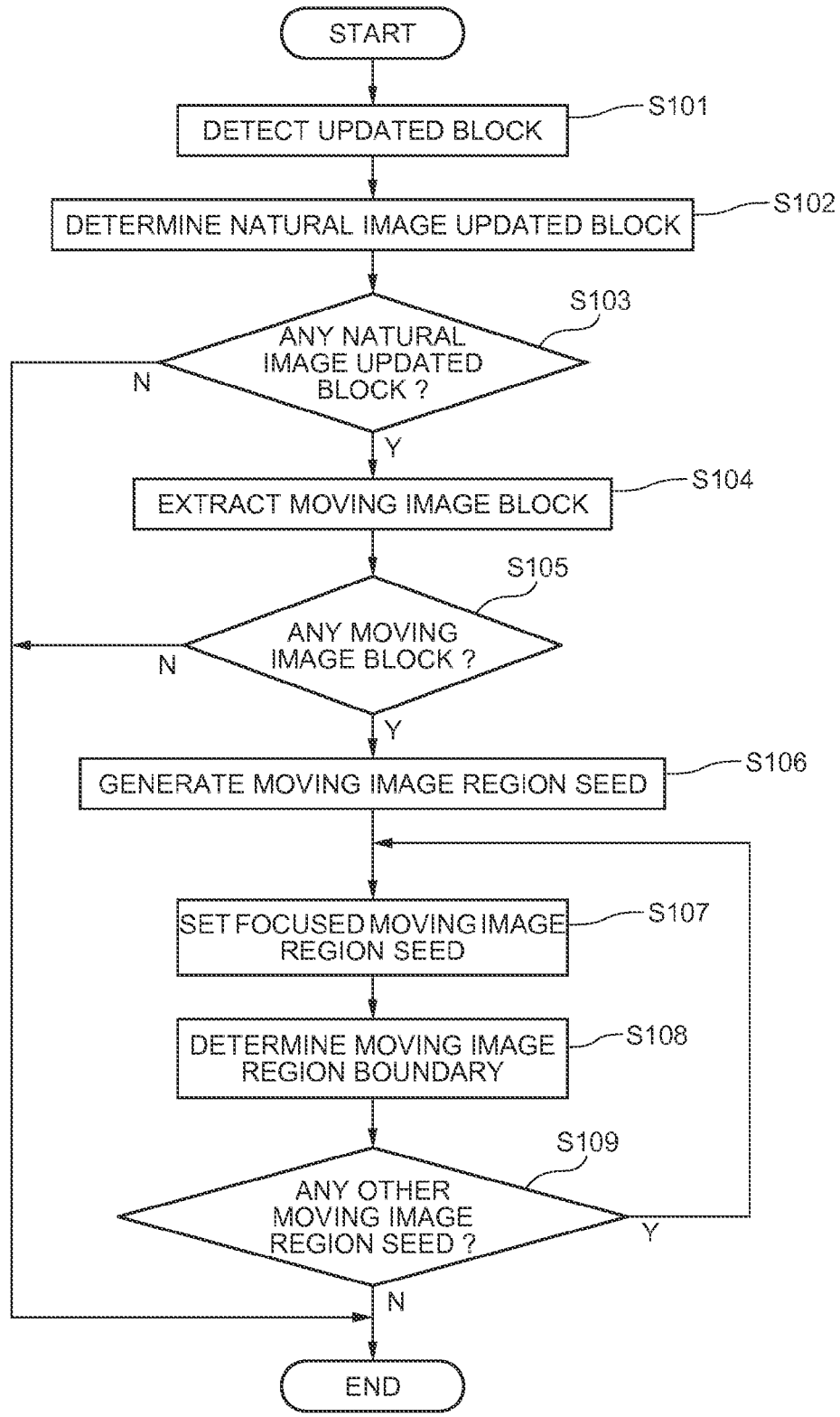
FIG. 10 is a flowchart showing the operation of the second exemplary embodiment of the present invention.

Next, the overall operation of the present embodiment will be described in detail with reference to the flowchart of FIG. 10.

The updated block detection means 131 reads and compares the image of the previous frame stored in the previous frame memory 121 with the image of the current frame stored in the current frame memory 122, and for each of the sub-regions (blocks) in the screen, determines whether or not there are any changes in the pixel value. The updated block detection means 131 determines the block in which the pixel value has been changed to be an updated block, and notifies the natural image updated block determination means 132 of the coordinate information of such a block (step S101).

Then, when the natural image updated block determination means 132 is notified of the coordinate information of the updated blocks from the updated block detection means 131, the natural image updated block determination means 132 reads the pixel value of each of the updated blocks from the previous frame memory 121 and the current frame memory 122, and acquires the spatial continuity and the temporal continuity of the pixel values. The natural image updated block determination means 132 determines a block having a certain continuity or higher to be a natural image updated block, and outputs the coordinate information thereof to the natural image updated block memory 123 (step S102).

Then, the moving image block extraction means 133 reads the content of the natural image updated block memory 123, and determines whether or not a natural image updated block is detected in the current frame (step S103). If it is not detected (N at step S103), the moving image block extraction means 133 ends the processing. If it is detected (Y at step S103), the moving image block extraction means 133 reads the state of the natural image updated block in the most recent N frames from the natural image updated block memory 123, determines a block having been detected as an updated block frequently to be a moving image block of a natural image, and outputs the coordinate information thereof to the moving image block memory 124 (step S104).

Then, the moving image region seed generation means 134 reads the content of the moving image block memory 124, and determines whether or not a moving image block of a natural image is detected in the current frame (step S105). If it is not detected (N at step S105), the moving image region seed generation means 134 ends the processing. If it is detected (Y at step S105), the moving image region seed generation means 134 reads the information of the moving image block of the natural image from the moving image block memory 124, and links/integrates spatially adjacent moving image blocks of a natural image. The moving image region seed generation means 134 determines the region obtained through the integration to be a moving image region seed of a natural image, and outputs the coordinate information thereof to the moving image region coordinate memory 125 (step S106).

Then, the moving image region boundary determination means 135 sequentially extracts pieces of the coordinate information of the moving region seeds of a natural image generated by the moving image region seed generation means 134 one by one from the moving image region coordinate memory 125, and sets it as a focused moving image region seed (step S107).

Then, the moving image region boundary determination means 135 reads the coordinate of the focused moving image region seed from the moving image region coordinate memory 125, reads the states of the most recent N frames from the natural image updated block memory 123, and reads pixel values around the moving image region seed from the previous frame memory 121 and the current frame memory 122, and determines the coordinates of the boundary of the moving image region of a natural image in pixel units. Further, the moving image region boundary determination means 135 stores the obtained coordinates of the moving image region of a natural image in the moving image boundary coordinate memory 125, and outputs them to the moving image region information output device 14.

Then, the moving image region boundary determination means 135 determines whether or not there is any unprocessed moving image region seed of a natural image (step S109), and if any (Y at step S109), returns to step S107 to continue the processing. If not (N at step S109), the moving image region boundary determination means 135 ends the processing.

It should be noted that in the above description, as a linking method used by the moving image region seed generation means 134, a method of integrating regions in directions of columns and rows by using blank rows and blank columns as delimiters. However, another method can be used. For example, it is possible to use a method of linking spatially adjacent moving image blocks of a natural image, performing labeling on the linked regions, and then acquiring a circumscribed rectangle with respect to each region having a label value to generate a moving image region seed of a natural image. As a method of linking and labeling, there is a method of continuously linking four neighboring adjacent blocks sequentially until labels of all blocks are determined. In addition, it is also possible to use a method of linking blocks by breaking down the processing units recursively from the resolutions such as ⅛, ¼, and ½.

In this process, the moving image region seed generation means 134 may also apply filtering processing so as to prevent generation of extremely small moving image region seeds in a large number. For example, it is possible not to accept moving image region seeds of a natural image having a certain area or smaller so as not to output such seeds to the moving image region coordinate memory 125. Further, it is also possible to accept only a moving image region seed of a natural image having the largest area within the frame.

Effects of the present embodiment will be described.

According to the present embodiment, it is possible to detect a region of a moving natural image with high accuracy from a computer screen video in which graphics and moving images are mixed.

Further, as the present embodiment detects a moving image region, motion detection processing is unnecessary, whereby it is possible to reduce the load for detection.

This is because after stably detecting a region which has continuously changed spatially and temporary in block units, the present embodiment searches for the boundary in detail corresponding to the surrounding pixel conditions.

Other Embodiments

While the exemplary embodiments of the present invention have been described, the functions of the present invention can be realized by computers and programs, as well as being realized by hardware. A program is provided by being stored on a computer-readable storing medium such as a magnetic disk, a semiconductor memory, or the like, is read by a computer when the computer is on for example, and by controlling the operation of the computer, the program allows the computer to function as the respective means in the exemplary embodiments described above.

The present invention is based upon and claims the benefit of priority from Japanese patent application No. 2011-154389, filed on Jul. 13, 2011, the disclosure of which is incorporated herein in its entirety by reference.

INDUSTRIAL APPLICABILITY

The present invention is applicable to a field of detecting a moving image region of a natural image from an input video and encoding the moving image region of a natural image by using MPEG, for example.

The whole or part of the exemplary embodiments disclosed above can be described as, but not limited to, the following supplementary notes.

(Supplementary Note 1)

A moving image region detection device, comprising:

an updated block detection means for comparing pixel values between a current frame and a previous frame of an input image, and detecting a block including a pixel in which a value has been changed as an updated block;

a natural image updated block determination means for, with respect to each of the updated blocks, calculating an index value representing a degree of continuity of changes in pixel values in the block, comparing the calculated index value with a threshold, and determining whether or not the updated block is an updated block of a natural image; and a moving image block extraction means for extracting a block of a coordinate determined to be an updated block of a natural image a given number of times or more in a plurality of most recent frames, as a moving image block of a natural image.

(Supplementary Note 2)

The moving image region detection device, according to supplementary note 1, further comprising a moving image region seed generation means for linking the moving image blocks of a natural image, which are spatially adjacent to each other, and acquiring a circumscribed rectangle of the linked moving image blocks of the natural image as a moving image region seed.

(Supplementary Note 3)

The moving image region detection device, according to supplementary note 2, further comprising a moving image region boundary determination means for, with respect to four edges on top, bottom, left, and right of the moving image region seed, searching for and determining a boundary of the moving image region in pixel unites.

(Supplementary Note 4)

The moving image region detection device, according to supplementary note 3, wherein the moving image region boundary determination means includes a block unit region expansion means for attempting to expand, in block units, each of the four edges on top, bottom, left, and right of the moving image region given in block units, and with respect to a block of a coordinate which may be newly added to the region by expansion, the block unit region expansion means calculates the average number of times that the block has been determined to be an updated block of a natural image within a given number of most recent frames, and if a calculated value exceeds a given value, expands the edge by one block.

(Supplementary Note 5)

The moving image region detection device, according to supplementary note 3, wherein the moving image region boundary determination means includes a pixel unit region boundary determination means for determining a boundary in pixel units with respect to each of the four edges on top, bottom, left, and right of the moving image region given in block units, and the pixel unit region boundary determination means scans one inside block and one outside block of the given region boundary in line units, and selects, as a moving image region boundary, a line in which non-continuity of changes in pixel values in temporal and spatial directions becomes highest between the outside and the inside of the line.

(Supplementary Note 6)

The moving image region detection device, according to supplementary note 5, wherein with respect to each coordinate of a focused line, the pixel unit region boundary determination means calculates $D_P$ as a difference between a pixel value of a focused coordinate in the current frame and a pixel value of the same coordinate in the previous frame, calculates $D_N$ as a difference between the pixel value of the focused coordinate in the current frame and a pixel value outside the coordinate by one line, calculates $D_{NL}$ as a difference between pixel values outside the focused coordinate in the current frame by one line, in a direction orthogonal to a searching direction, calculates $D_{PN}$ as a difference between a pixel value in the current frame and a pixel value in the previous frame at a coordinate outside the focused coordinate by one line, calculates the sum of $(D_N-D_{NL}+D_P-D_{PN})$ with respect to the focused line, and selects a line in which the calculated sum becomes maximum as the boundary.

(Supplementary Note 7)

The moving image region detection device, according to any of supplementary notes 1 to 6, wherein the natural image updated block determination means calculates the size of spatial transitions of pixel values in the focused block in the current frame, and determines a block in which an average value of the calculated transitions is small to be an updated block of a natural image.

(Supplementary Note 8)

The moving image region detection device, according to supplementary note 7, wherein the natural image updated block determination means calculates the average value by selecting only non-zero transitions.

(Supplementary Note 9)

The moving image region detection device, according to any of supplementary notes 1 to 6, wherein with respect to each coordinate in the updated block, the natural image updated block determination means calculates, as an edge value, a smaller value of a difference absolute value between horizontally adjacent pixels and a difference absolute value between vertically adjacent pixels, calculates an average value of non-zero edge values within the block, and determines a block in which the average value is smaller than a given value to be an updated block of a natural image.

(Supplementary Note 10)

The moving image region detection device, according to any of supplementary notes 1 to 6, wherein the natural image updated block determination means calculates transitions in a spatial direction of pixel values within the current frame and transitions of pixel values of the same pixels between the current frame and the previous frame, and determines a block in which an average value of the calculated transitions is small to be an updated block of a natural image.

(Supplementary Note 11)

The moving image region detection device, according to any of supplementary notes 1 to 6, wherein with respect to each pixel of the updated block in the current frame, the natural image updated block determination means calculates a first difference between pixel values of adjacent pixels in the current frame and a second difference between the same pixels in the current frame and the previous frame, selects a value, which is not larger than the other, from a difference between the first difference calculated with respect to the pixel and the first difference calculated with respect to a pixel immediately before the pixel, and a difference between the second difference calculated with respect to the pixel and the second difference calculated with respect to a pixel immediately before the pixel, calculates an average value of the selected values which is non-zero values within the block, and determines a block in which an average value is smaller than a given value to be an updated block of a natural image.

(Supplementary Note 12)

A moving image region detection method, comprising:

comparing pixel values between a current frame and a previous frame of an input image, and detecting a block including a pixel in which a value has been changed as an updated block;

with respect to each of the updated blocks, calculating an index value representing a degree of continuity of changes in pixel values in the block, comparing the calculated index value with a threshold, and determining whether or not the updated block is an updated block of a natural image; and extracting a block of a coordinate determined to be an updated block of a natural image a given number of times or more in a plurality of most recent frames, as a moving image block of a natural image.

(Supplementary Note 13)

A program for causing a computer to function as:

an updated block detection means for comparing pixel values between a current frame and a previous frame of an input image, and detecting a block including a pixel in which a value has been changed as an updated block;

a natural image updated block determination means for, with respect to each of the updated blocks, calculating an index value representing a degree of continuity of changes in pixel values in the block, comparing the calculated index value with a threshold, and determining whether or not the updated block is an updated block of a natural image; and a moving image block extraction means for extracting a block of a coordinate determined to be an updated block of a natural image a given number of times or more in a plurality of most recent frames, as a moving image block of a natural image.

DESCRIPTION OF REFERENCE NUMERALS 1 moving image region detection device
2 updated block detection means
3 natural image updated block determination means
4 moving image block extraction means

The invention claimed is:

1. A moving image region detection device, comprising:
a memory containing program instructions; and
a processor coupled to the memory, wherein the processor is configured to execute the program instructions to:
  compare, with respect to a frame of an input video, pixel values between the frame and a previous frame of the frame;
  detect, from among a plurality of blocks formed by dividing the frame into blocks, a block including a pixel in which a value has been changed as an updated block;
  calculate, with respect to the updated block of the frame, an index value representing a degree of continuity of changes in pixel values in the updated block;
  compare the calculated index value with a threshold;
  determine whether or not the updated block is an updated block of a natural image;
  extract, with respect to the frame, a block determined to be an updated block of a natural image a given number of times or more in a plurality of most recent frames including the frame, as a moving image block of a natural image;
  link, with respect to the frame, the moving image blocks of a natural image, which are spatially adjacent to each other;
  acquire a circumscribed rectangle of the linked moving image blocks of the natural image as a moving image region seed of the natural image;
  search for and determine, with respect to four edges on top, bottom, left, and right of the moving image region seed of the natural image, a boundary of the moving image region of the natural image in pixel units;
  attempt to expand, in block units, each of the four edges on top, bottom, left, and right of the moving image region of the natural image given in block units;
  calculate, with respect to a block which may be newly added to the moving image region of the natural image by expansion, the average number of times that the block has been determined to be an updated block of a natural image within a given number of most recent frames; and
  add the block to the moving image region of the natural image if a calculated value exceeds a given value.

2. A moving image region detection device comprising:
a memory containing program instructions; and
a processor coupled to the memory, wherein the processor is configured to execute the program instructions to:

compare, with respect to a frame of an input video, pixel values between the frame and a previous frame of the frame;

detect, from among a plurality of blocks formed by dividing the frame into blocks, a block including a pixel in which a value has been changed as an updated block;

calculate, with respect to the updated block of the frame, an index value representing a degree of continuity of changes in pixel values in the updated block;

compare the calculated index value with a threshold;

determine whether or not the updated block is an updated block of a natural image;

extract, with respect to the frame, a block determined to be an updated block of a natural image a given number of times or more in a plurality of most recent frames including the frame, as a moving image block of a natural image;

link, with respect to the frame, the moving image blocks of a natural image, which are spatially adjacent to each other;

acquire a circumscribed rectangle of the linked moving image blocks of the natural image as a moving image region seed of the natural image; and search for and determine, with respect to four edges on top, bottom, left, and right of the moving image region seed of the natural image, a boundary of the moving image region of the natural image in pixel units, wherein searching for and determining a boundary comprises determining a boundary in pixel units with respect to each of the four edges on top, bottom, left, and right of the moving image region of the natural image given in block units, and selecting as a moving image region boundary, from among a plurality of lines for one inside block and one outside block of the region boundary given, a line in which non-continuity of changes in pixel values in temporal and spatial directions becomes highest between the outside and the inside of the line.

3. The moving image region detection device, according to claim 2, wherein with respect to each of the plurality of the lines, the pixel unit region boundary determination unit calculates a difference $D_P$ between a pixel value of the line in the frame and a pixel value of the line in the previous frame, calculates a difference $D_N$ between the pixel value of the line in the frame and a pixel value of a line outside the line by one line, calculates a difference $D_{NL}$ between pixel values of the line outside the line by one line in the frame, in a direction parallel to the line, calculates a difference $D_{PN}$ between a pixel value in the frame and a pixel value in the previous frame of the frame, of the line outside the line by one line of the frame, and selects a line in which a value calculated by $D_N-D_{NL}+D_P-D_{PN}$ becomes maximum as the moving image region boundary.

4. The moving image region detection device, according to claim 1, wherein the processor is further configured to:

calculate transitions in a spatial direction of pixel values within the frame, and determine a block in which an average value of the calculated transitions is small to be an updated block of the natural image.

5. The moving image region detection device, according to claim 1, wherein the processor is further configured to:

calculate transitions in a spatial direction of pixel values within the frame and transitions of pixel values of the same pixels between the frame and the previous frame of the frame, and determine a block in which an average value of the calculated transitions is small to be an updated block of the natural image.

6. A moving image region detection method, comprising:

comparing, with respect to a frame of an input video, pixel values between the frame and a previous frame of the frame;

detecting, from among a plurality of blocks formed by dividing the frame into blocks, a block including a pixel in which a value has been changed as an updated block;

calculating, with respect to the updated block of the frame, an index value representing a degree of continuity of changes in pixel values in the updated block;

comparing the calculated index value with a threshold;

determining whether or not the updated block is an updated block of a natural image;

extracting, with respect to the frame, a block determined to be an updated block of a natural image a given number of times or more in a plurality of most recent frames including the frame, as a moving image block of a natural image;

linking, with respect to the frame, the moving image blocks of a natural image, which are spatially adjacent to each other;

acquiring a circumscribed rectangle of the linked moving image blocks of the natural image as a moving image region seed of the natural image;

searching for and determining, with respect to four edges on top, bottom, left, and right of the moving image region seed of the natural image, a boundary of the moving image region of the natural image in pixel units;

attempting to expand, in block units, each of the four edges on top, bottom, left, and right of the moving image region of the natural image given in block units;

calculating, with respect to a block which may be newly added to the moving image region of the natural image by expansion, the average number of times that the block has been determined to be an updated block of a natural image within a given number of most recent frames; and adding the block to the moving image region of the natural image if a calculated value exceeds a given value.

7. A non-transitory computer readable medium having stored thereon a program for causing a computer to:

compare, with respect to a frame of an input video, pixel values between the frame and a previous frame of the frame;

detect, from among a plurality of blocks formed by dividing the frame into blocks, a block including a pixel in which a value has been changed as an updated block;

calculate, with respect to the updated block of the frame, an index value representing a degree of continuity of changes in pixel values in the updated block;

compare the calculated index value with a threshold; and determine whether or not the updated block is an updated block of a natural image;

extract, with respect to the frame, a block determined to be an updated block of the natural image a given number of times or more in a plurality of most recent frames including the frame, as a moving image block of the natural image;

link, with respect to the frame, the moving image blocks of the natural image, which are spatially adjacent to each other;

acquire a circumscribed rectangle of the linked moving image blocks of the natural image as a moving image region seed of the natural image;

search for and determine, with respect to four edges on top, bottom, left, and right of the moving image region seed of the natural image, a boundary of the moving image region of the natural image in pixel units;

attempt to expand, in block units, each of the four edges on top, bottom, left, and right of the moving image region of the natural image given in block units;

calculate, with respect to a block which may be newly added to the moving image region of the natural image by expansion, the average number of times that the block has been determined to be an updated block of the natural image within a given number of most recent frames; and add the block to the moving image region of the natural image if a calculated value exceeds a given value.

\* \* \* \* \*